United States Patent [19]

De Nardo

[11] 4,174,868

[45] Nov. 20, 1979

[54] APPARATUS FOR PNEUMATICALLY APPLYING MATERIAL TO AN OBJECT

[76] Inventor: John M. De Nardo, 1044 Amherest St., Buffalo, N.Y. 14216

[21] Appl. No.: 827,478

[22] Filed: Aug. 25, 1977

[51] Int. Cl.$^2$ .............. B65G 53/10

[52] U.S. Cl. .............. 406/76; 222/80; 222/327; 222/389

[58] Field of Search .............. 222/80, 82, 85, 87, 222/326, 327, 389; 239/313, 317, 322; 302/11, 40, 51; 137/564.5; 401/135

[56] References Cited

U.S. PATENT DOCUMENTS

| | | | |
|---|---|---|---|
| 1,578,944 | 3/1926 | Wilkinson | 222/389 X |
| 2,373,774 | 4/1945 | Murnane | 222/326 X |
| 2,446,501 | 8/1948 | Weber | 222/389 |
| 2,733,836 | 2/1956 | Switzer | 222/82 |
| 3,136,456 | 6/1964 | Sherbondy | 222/389 |
| 3,442,424 | 5/1969 | Prussin et al. | 222/389 X |
| 3,964,641 | 6/1976 | Langensiepen et al. | 222/389 X |

*Primary Examiner*—Francis J. Bartuska
*Attorney, Agent, or Firm*—Sommer & Sommer

[57] ABSTRACT

The present invention provides apparatus which is adapted to be connected to a source of compressed air for pneumatically applying material to an object. The apparatus includes a main conduit having one end connected to the source of compressed air, and having an opposite discharge end; a tubular wall having open ends and adapted to contain a quantity of material therewithin; and a piston slidably mounted within the tubular wall. A supply conduit communicates one end of the tubular wall with the main conduit. A pressurizing conduit is arranged to cause pneumatic pressure to be selectively applied to the piston to extrude material through the supply conduit into the main conduit. Such extruded material is propelled along the main conduit by a continuous flow of compressed air therethrough, and is ultimately discharged on to the object.

7 Claims, 9 Drawing Figures

Fig. 1.
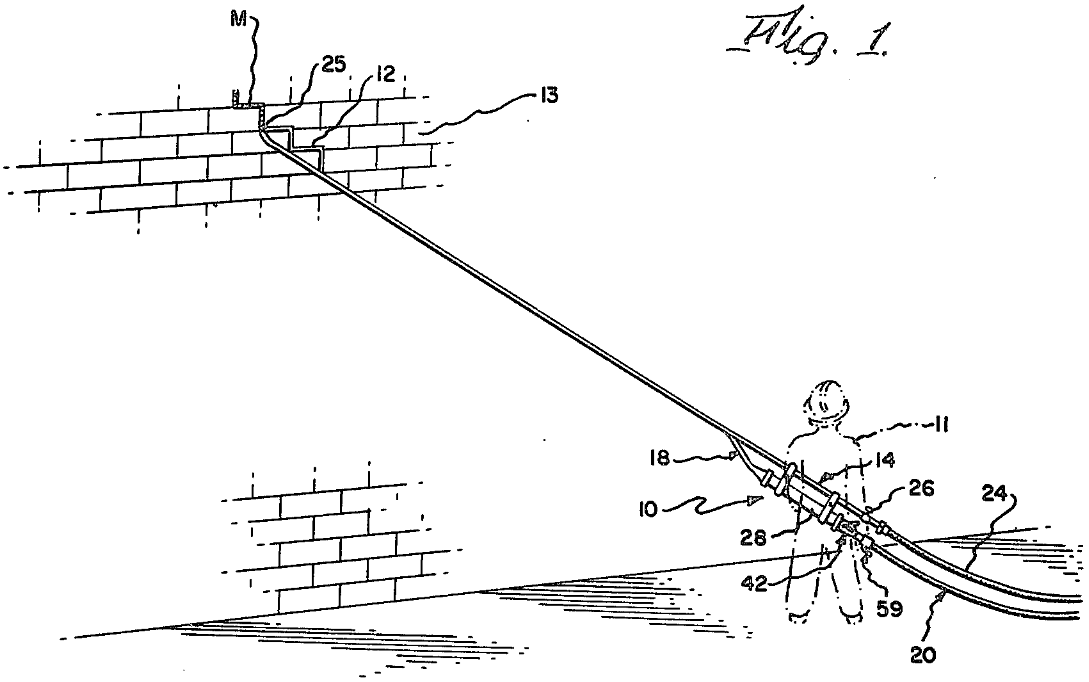
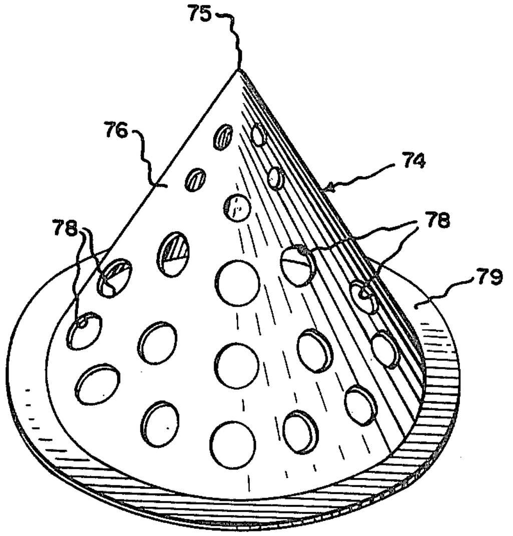
Fig. 7.
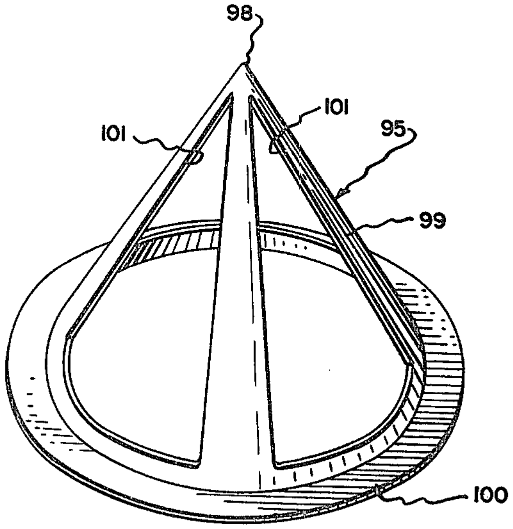
Fig. 8.
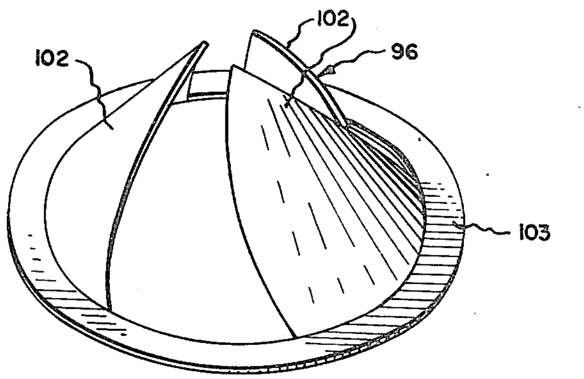
Fig. 9.

APPARATUS FOR PNEUMATICALLY APPLYING MATERIAL TO AN OBJECT

BACKGROUND OF THE INVENTION

1. Field of the Invention

The present invention relates generally to apparatus for applying material to an object, and more particularly to improved apparatus for sealing cracks and spalled areas in the refractory brick lining of a hot coke oven.

2. Description of the Prior Art

Coke is a well known industrial fuel which is produced by removing most of the volatile gases from coal through heating of coal in the absence of air. Upon information and belief, coke ovens are commonly lined with a refractory material, such as fire brick. During such distillation of coal, the volatile gases are collected and are used to produce a number of useful chemical products.

Due to temperature fluxuations, as by the opening of an access door, the refractory brick lining of such coke ovens generally requires repeated, if not continuous, maintenance to repair cracks and spalled areas.

Upon information and belief, such cracks and spalled areas are commonly repaired by application of a discharged liquid coating, or by an operator using a mortar-applying trowel on one end of a long handle. While these two methods may give the appearance of having sealed the imperfection, both methods are believed to effect only surface repair, and do not fill the depth of a crack, for example.

SUMMARY OF THE INVENTION

The present invention provides apparatus for applying a material to an object, and more particularly to improved apparatus for applying a high temperature mortar to a crack, fissure or spalled area of the refractory brick lining of a coke oven.

The apparatus is adapted to be connected to a suitable source of compressed air, such as a conventional air compressor. The apparatus broadly includes a main conduit having an open first end arranged to be supplied with a flow of compressed air from the source, and having an open second end through which material is to be discharged; a tubular wall having open first and second ends and adapted to contain a quantity of material therewithin; a supply conduit communicating the tubular wall first end with the main conduit; a piston operatively arranged within the tubular wall for sliding movement therealong, this piston having a first face arranged to act on the material and having an opposite second face; and a pressurizing conduit communicating the wall second end with the source of compressed air and operable to selectively apply pneumatic pressure to the piston second face to displace the piston along the tubular wall and to extrude material into the main conduit. Such extruded material entering the main conduit is propelled therealong by the flow of air therethrough, and is discharged through the main conduit second end on to the object.

A cutter may be operatively arranged to penetrate the piston near the end of its stroke, and the piston may be scored or perforated to facilitate such penetration. In the preferred embodiment, the cutter has a conical outer surface and includes a pointed apex. A trigger valve may be arranged in the pressurizing conduit, and such flow of compressed air in the pressurizing conduit may be diffused or distributed by a diffuser to apply uniformly distributed pneumatic pressure to the piston. In the preferred embodiment, the material, piston and tubular wall are parts of a disposable cartridge.

Accordingly, the general object of the present invention is to provide apparatus for pneumatically applying material to an object.

Another object is to provide improved apparatus for applying high temperature mortar to the refractory brick lining of a hot coke oven.

These and other objects and advantages will become apparent from the foregoing and ongoing written specification, the drawings, and the appended claims.

BRIEF DESCRIPTION OF THE DRAWINGS

FIG. 1 is a perspective view of an operator using the improved apparatus to apply material to a crack in a brick wall.

FIG. 7 is an enlarged perspective detail view of the cutter shown in FIGS. 2, 3 and 6.

FIG. 8 is a perspective detail view of a first modified cutter.

FIG. 9 is a perspective detail view of a second modified cutter.

DESCRIPTION OF THE PREFERRED EMBODIMENTS

Figures 2, 3, 4, 5, 6:
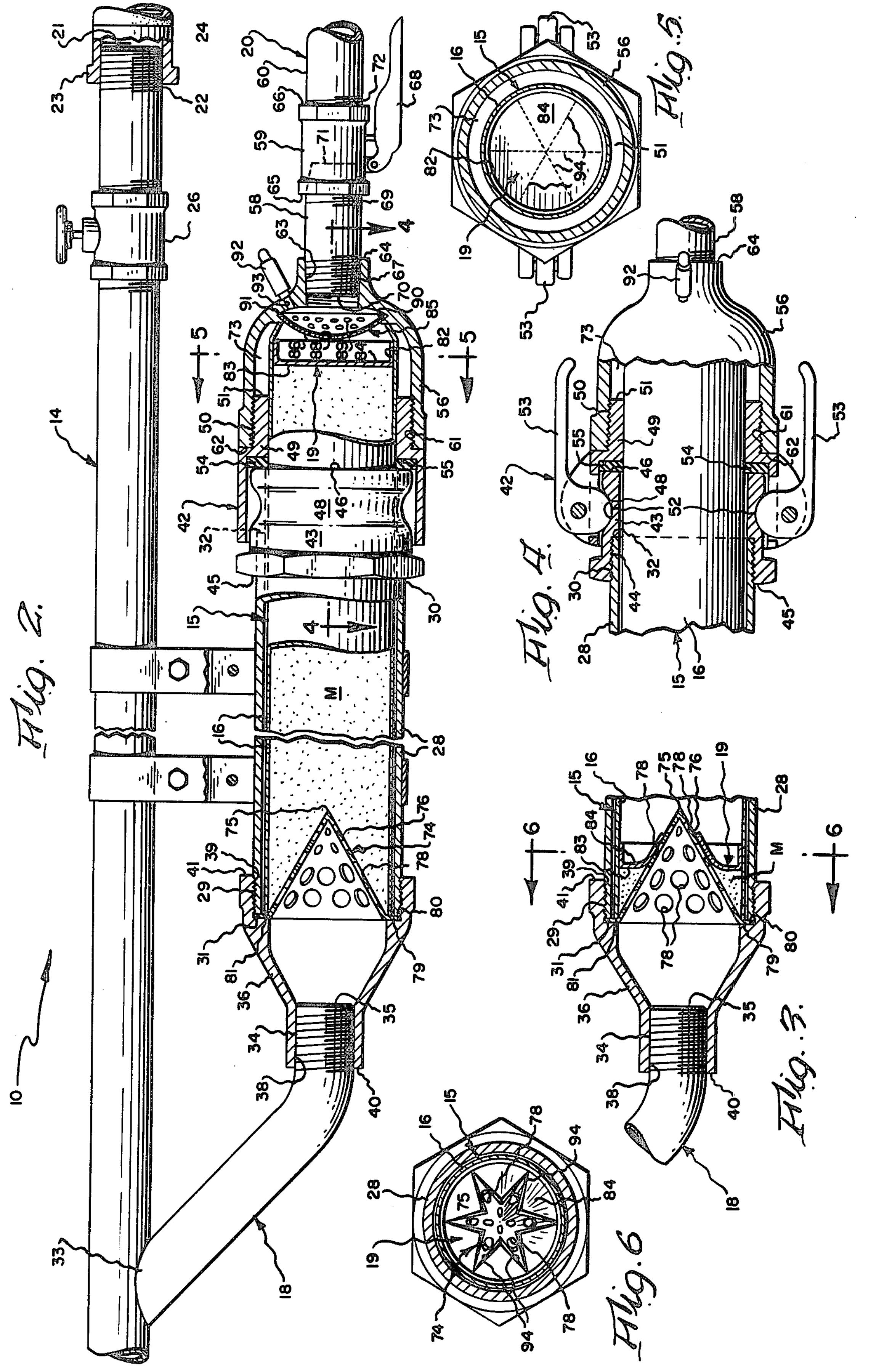
FIG. 2 is an enlarged fragmentary view of the apparatus, showing the main conduit in side elevation, and showing the casing, cartridge, cutter and piston in longitudinal vertical cross-section.
FIG. 3 is a fragmentary longitudinal vertical sectional view of the cutter, this view showing the apex of the cutter as penetrating the piston near the end of its stroke.
FIG. 4 is a fragmentary longitudinal horizontal sectional view thereof, taken generally on line 4—4 of FIG. 2, showing the operative connection between the two quick-connect fitting sections.
FIG. 5 is a fragmentary transverse vertical sectional view thereof, taken generally on line 5—5 of FIG. 2, and principally showing the scored piston in rear elevation.
FIG. 6 is a fragmentary transverse vertical sectional view thereof, taken generally on line 6—6 of FIG. 3, showing, in rear elevation, the nose of the cutter as penetrating the piston.

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the drawings, and more particularly to FIG. 1 thereof, the present invention provides improved apparatus, of which the presently preferred embodiment is generally indicated at 10, for pneumatically applying material, such as mortar and the like, to an object. In FIG. 1, an operator 11 is shown as using the apparatus 10 to apply a suitable mortar to fill a crack 12 in the refractory brick wall 13 of a coke oven. While the improved apparatus possesses great utility in repairing or sealing such refractory brick, persons skilled in this art will readily appreciate that the apparatus possesses a more general utility apart from the illustrated environment of use, and may be widely used to apply other types of liquid to semi-solid materials to a suitable object. Hence, the particular environment of use depicted in FIG. 1 should not be regarded as limitative of the scope of the appended claims.

Referring now additionally to FIG. 2, the improved apparatus 10 is shown as broadly including a main conduit 14, a cartridge 15 having a tubular wall 16, a supply conduit 18, a piston 19, and a pressurizing conduit 20.

Still referring principally to FIG. 2, the main conduit 14 is shown as being a horizontally-elongated pipe-like member having an open first end 21 and having an externally-threaded marginal portion 22 adjacent thereto. This main conduit marginal portion 22 is adapted to sealingly receive a threaded connector 23 of flexible air line 24 connected to a suitable source (not shown) of compressed air, such as an air compressor or the like. Thus, the main conduit has an open first end 21 communicating with and arranged to receive a flow of compressed air from such source. As best shown in FIG. 1, this main conduit also has an open second end 25 through which material is to be discharged. Adverting now to FIG. 2, the main conduit is shown as further including a gate valve 26 which may be selectively operated to regulate the flow of compressed air therethrough.

The preferred embodiment of apparatus 10 is shown as further including a horizontally-elongated cylindrical tubular casing 28 having externally-threaded marginal portions 29, 30 adjacent its open left and right ends 31, 32, respectively.

The supply conduit 18 is illustrated as including a bent pipe or tubular member having a marginal portion 33 adjacent its open upper end suitably secured, as by welding, to an intermediate portion of the main conduit, and having an externally-threaded marginal portion 34 adjacent its open lower end 35. As best shown in FIG. 3, the supply conduit also includes a reducing adapter 36 having internally-threaded marginal portions 38, 39 adjacent its open left and right ends 40, 41, respectively. Adapter threaded portion 38 is arranged to matingly engage supply pipe threaded marginal portion 34, and adapter threaded portion 39 is arranged to matingly engage casing threaded portion 29. In this manner, the leftward end of the casing 28 is communicatingly connected to an intermediate portion of the main conduit 14.

Referring now to FIGS. 2 and 4, the pressurizing conduit 20 is shown as being operatively connected to the right marginal end portion of casing 28 by a quick connect fitting, generally indicated at 42. This fitting 42 is individually old in the prior art and forms no part of the present invention claimed herein. Nevertheless, this fitting will be described in an abbreviated sense, merely to insure the sufficiency of the present disclosure of the preferred embodiment. To this end, fitting 42 is shown as having a leftward first section 43 provided with an internally-threaded marginal portion 44 adjacent its open left end 45, a vertical right end face 46, and an intermediate circumferential concave groove 48 extending radially inwardly from its outer surface. Fitting 42 also includes a rightward second section 49 having an externally-threaded marginal portion 50 adjacent its open right end 51, and having a plurality of levers pivotally mounted thereon. Each of these levers has a cam surface 52 adapted to be received in first section recess 48, and has an arm portion 53 which may be grasped and suitably manipulated to bring the cam surface 52 into or out of engagement with recess 48. These two sections 43, 49 are shown as being separated by a resilient washer 54, which will be compressed between first section right face 46 and second section face 55 when the two sections are joined together.

The pressurizing conduit 20 further includes, from left to right in FIG. 2, an adapter 56, a pipe 58, a trigger valve 59, and a pipe 60 communicatively connected to the source of compressed air. Adapter 56 is shown as having an internally-threaded portion 61 adjacent its leftward vertical face 62 and adapted to matingly engage fitting second section threaded portion 50, and having an internally-threaded marginal portion 63 adjacent its annular vertical right face 64. The trigger valve 59 is provided with internally-threaded portions (not shown) adjacent its left and right annular vertical faces 65, 66, and further includes lever 68 which may be suitably operated to permit different flow rates of compressed air to pass therethrough. Pipe 58 has externally-threaded marginal portions 67, 69 adjacent its left and right ends 70, 71, and these marginal portions are adapted to matingly engage the threaded portions in the fitting and valve, respectively. Similarly, the leftward marginal portion 72 of pipe 60 is also threaded, and is matingly received in the trigger valve. Therefore, the pressurizing conduit 20 is operatively arranged to selectively supply different flow rates of compressed air from the source thereof (not shown) through pipe 60, valve 59, and pipe 58, to enter the chamber 73 within adapter 56.

Referring now to FIGS. 2 and 3, the preferred embodiment of apparatus 10 is shown as further including a cutter, generally indicated at 74, operatively arranged between adapter 36 and casing 28. As best shown in FIG. 3, this cutter 74 is a thin-walled conical member having a pointed apex 75, a conical outer surface 76 provided with a plurality of openings 78 therethrough, and an outturned annular flange 79 adapted to be captured between the casing left end face 31 and a rightwardly-facing annular vertical surface 80 provided in adapter 36.

Averting now to FIG. 2, the cartridge 15 is shown as having a horizontally-elongated cylindrical wall 16 arranged within casing 28. This cartridge is shown as having an open left end 81, an open right end 82, and is adapted to contain a quantity of material M therewithin. While such material may be suitably liquid to semi-solid material, typical materials used to repair or seal cracks or spalled areas of refractory brick would typically include a high temperature mortar, such as silica or asbestos mortar.

Piston 19 is shown as being operatively arranged within tubular wall 16 for sliding movement therealong. As best shown in FIG. 2, piston 19 has a leftward circular vertical first face 83 arranged to act on material M, and has an opposite rightward circular vertical second face 84 adapted to be acted upon by pneumatic pressure supplied by pressurizing conduit 20.

Still referring principally to FIG. 2, a diffuser 85 is shown as being arranged within adapter 56, and functions to diffuse or distribute the flow of compressed air supplied through the pressurizing conduit so that the pressure of such supplied air will be uniformly distributed across piston second face 84. To this end, the diffuser 85 is shown as being a thin-walled spherically-segmented member having a convex left-facing surface 86, a concave right-facing surface 88, and is provided with a plurality of openings 89 through which such supplied air may pass. In the preferred embodiments, adapter 56 is provided with an internal annular substantially V-shaped notch 90 which is adapted to receive the marginal edge 91 of the diffuser. In this manner, a flow of compressed air delivered by the pressurizing conduit 20 will be diffused or spread out as such air passes through the diffuser openings 89 so that a uniformly distributed pneumatic pressure will be applied to piston right face 84.

As a safety precaution, a pressure release valve 92 is shown as threaded into a suitable tapped opening 93 provided through the wall of adapter 56. This pressure relief valve 92 is arranged to sense the pressure of compressed air supplied by the pressurizing conduit 20, and operates conventionally to release pressure if such supplied pressure exceeds a predetermined maximum pressure.

Referring now to FIGS. 5 and 6, the piston second face 84 is shown provided with a plurality of radially-extending score lines, severally indicated at 94, which are adapted to facilitate break up of the piston as the apex of cutter 74 penetrates the same at the end of the piston stroke (FIG. 6).

OPERATION

An operator desiring to repair a crack or spalled area in a refractory brick wall, for example, may first manipulate arms 53 of quick connect fitting 42 to separate the fitting first section 43 from the fitting section 49. With the fitting thus separated, the operator may slidably insert a cartridge 15 containing material M into the cylindrical casing 28. In the preferred embodiment, the piston 19 is formed as a subassembly with this cartridge. With the cartridge so inserted, the operator may reconnect fitting first and second sections 43, 49, and may thereafter open gate valve 26 to permit a desired flow of compressed air from the source (not shown) to pass through the main conduit 14 and be discharged through its nozzle-like open second end 25 (FIG. 1). Persons skilled in this art will appreciate that if the main conduit discharge end 25 is inserted into a hot coke oven, the continuous flow of air through the main conduit 14 will provide a cooling effect.

Thereafter, the operator may manipulate the apparatus such that the main conduit discharge opening 25 is aligned with the crack or spalled area to be repaired. The operator may then selectively operate trigger valve 59 to permit compressed air supplied by the pressurizing conduit 20 to pass through the diffuser 85 and act on the second face of the piston. Trigger valve 59 may be suitably operated to cause the piston to be moved slidably along the cartridge and to extrude quantities of the material from the cartridge. Such extruded material passes through cutter openings 78 and the supply conduit 18 to enter the main conduit, wherein it is propelled therealong by the continuous flow of compressed air therethrough, and is discharged on the area to be repaired. The operator may selectively operate trigger valve lever 68 to extrude the desired quantity of material from the cartridge.

The piston 19 will travel along the cartridge as the material contained therein is consumed in use. Near the end of its stroke, the apex or pointed edge of cutter 74 will penetrate the piston, and allow a flow of compressed air supplied through the pressurizing conduit to blow residual quantities of material in the supply conduit 18 into the main conduit for subsequent discharge. Thus, this feature tends to prevent clogging of the supply conduit, and is particularly useful in the application of quick setting mortar used in coke ovens and other high temperature environments.

Two modified embodiments of the cutter are indicated at 95 and 96 in FIGS. 8 and 9, respectively. In FIG. 8, the first modified cutter 95 is also shown as being a conically-shaped member having a pointed apex 98, a conical outer surface 99, and an outturned annular mounting flange 100. However, in this form, the cutter is provided with a plurality of relatively large area substantially triangular openings 101 to accommodate passage of a relatively viscous or semi-solid material having, for example, a somewhat paste-like consistency. In FIG. 9, the second modified cutter 96 is shown as having three cutter members 102 extending upwardly and inwardly from outturned annular flange 103. Each of these cutter members 102 has a pointed or sharpened upper edge which is adapted to penetrate the piston near the end of its stroke.

Of course, various modifications and changes may be made from the preferred embodiments specifically illustrated and heretofor described. For example, while many of the parts and components of the apparatus are shown as being formed from a suitable metal, the present invention contemplates that other materials, achieving like objects and advantages, may be substituted therefor. Likewise, other types of valves could be substituted for the gate and trigger valves 26, 59, as desired. The employment of the cutter is also optional, although this feature is deemed as being particularly useful when the apparatus is used to apply a quick setting material. Indeed, while three specific embodiments of the cutter have been shown, various additional modifications may be made. For example, the number, size and configuration of the cutter opening may be readily changed to suit the particular material to be applied.

Also, other types of fittings may be readily substituted for quick connect fitting 42, and the use of a cartridge is also optional. Alternatively, such cartridge could be omitted, and casing 28 could be filled with the material M and be arranged to receive direct slidable insertion of a piston. Of course, the apparatus may be employed to apply a wide range of different materials ranging in consistency from liquids to viscous paste-like semi-solids.

Therefore, while a preferred embodiment of the inventive apparatus has been shown and described, and several modifications thereof discussed, persons skilled in this art will appreciate that various additional changes and modifications may be made without departing from the spirit of the invention which is defined in the following claims.

What is claimed is:

1. Apparatus for pneumatically applying material to an object, said apparatus being adapted to be connected to a source of compressed air, said apparatus comprising:

a main conduit having an open first end arranged to be supplied with a flow of compressed air from said source, and having an open second end through which material is to be discharged;

a supply conduit having an open first end communicating with said main conduit and having an open second end;

a tubular casing having a first end connected to said supply conduit second end and having a second end;

a tubular wall arranged within said casing and having open first and second ends and adapted to contain a quantity of said material therewithin, said wall first end being in communication with said main conduit through said supply conduit;

a piston operatively arranged within said tubular wall for sliding movement therealong, said piston having a first face arranged to act on material within said tubular wall and having an opposite second face;

a pressurizing conduit connected to said casing second end and communicating said wall second end with said source and selectively operable to apply pneumatic pressure to said piston second face to displace said piston along said tubular wall and to cause extruded material to enter said main conduit; and a diffuser mounted on said casing between said pressurizing conduit and piston and operable to diffuse a flow of compressed air delivered therethrough;

whereby extruded material entering said main conduit may be propelled therealong by said flow of compressed air therethrough, and may be discharged through said main conduit second end.

2. The apparatus as set forth in claim 1 and further comprising:

a cutter arranged proximate and said tubular wall first end and operative to penetrate said piston at the end of its stroke.

3. The apparatus as set forth in claim 2 wherein said piston is scored to facilitate such penetration by said cutter.

4. The apparatus as set forth in claim 2 wherein said cutter has a substantially conical surface provided with a plurality of openings through which said material may pass.

5. The apparatus as set forth in claim 2 wherein said cutter has at least one blade arranged to penetrate said piston.

6. The apparatus as set forth in claim 1 and further comprising:

a trigger valve arranged in said pressurizing conduit and selectively operable to cause pneumatic pressure to act on said piston second face.

7. The apparatus as set forth in claim 1 and further comprising:

a pressure relief valve mounted on said casing and operable to release pressure applied to said piston second face if said pressure exceeds a predetermined maximum pressure.

* * * * *